United States Patent
Tang et al.

(10) Patent No.: US 12,451,141 B2
(45) Date of Patent: Oct. 21, 2025

(54) GENERATING MULTI-TURN DIALOG DATASETS

(71) Applicant: INTERNATIONAL BUSINESS MACHINES CORPORATION, Armonk, NY (US)

(72) Inventors: Zilu Tang, Cambridge, MA (US); Zhongshen Zeng, Shenzhen (CN); Yara Rizk, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 17/805,946

(22) Filed: Jun. 8, 2022

(65) Prior Publication Data

US 2023/0402040 A1  Dec. 14, 2023

(51) Int. Cl.
| | |
|---|---|
| *G06F 16/31* | (2019.01) |
| *G06F 7/58* | (2006.01) |
| *G06N 3/08* | (2023.01) |
| *G10L 17/18* | (2013.01) |
| *G06N 5/022* | (2023.01) |
| *G10L 15/22* | (2006.01) |

(52) U.S. Cl.
CPC .............. *G10L 17/18* (2013.01); *G06F 7/588* (2013.01); *G06N 3/08* (2013.01); *G06F 16/322* (2019.01); *G06N 5/022* (2013.01); *G10L 15/22* (2013.01)

(58) Field of Classification Search
CPC ........ G06F 16/322; G06N 5/022; G10L 15/22
See application file for complete search history.

(56) References Cited

U.S. PATENT DOCUMENTS

| | | | |
|---|---|---|---|
| 2014/0019385 A1* | 1/2014 | Dawson | G06F 40/205 706/55 |
| 2017/0316777 A1* | 11/2017 | Perez | G06F 40/35 |

(Continued)

OTHER PUBLICATIONS

Palivela, "Optimization of paraphrase generation and identification using language models in natural language processing," IJIMDI, 2021. (Year: 2021) (Year: 2021).*

(Continued)

*Primary Examiner* — Feng-Tzer Tzeng
(74) *Attorney, Agent, or Firm* — Anthony Curro

(57) ABSTRACT

An embodiment for generating multi-turn dialog datasets for training of dialog or conversational agents. The embodiment may select an agent from a set of agents. The embodiment may automatically identify sentences from training data of the selected agent that satisfy a first sequential node condition of the selected random dialog node. The embodiment may automatically determine an approach for responding to the first sequential node condition of the selected random dialog node that either satisfies the first sequential dialog node condition, or inserts a multi-turn conversational property, and generate a corresponding response. The embodiment may automatically determine additional approaches for responding to each condition within subsequent sequential child nodes of the selected random dialog node that either satisfy each subsequent sequential child node condition or insert a multi-turn conversational property, and generate corresponding responses. The embodiment may collect and store data relating to the selected agent and the generated responses.

20 Claims, 5 Drawing Sheets

(56) References Cited

U.S. PATENT DOCUMENTS

| | | | |
|---|---|---|---|
| 2019/0065627 A1 | 2/2019 | De Mel | |
| 2019/0213685 A1* | 7/2019 | Ironside | G06F 18/214 |
| 2019/0237061 A1* | 8/2019 | Rusak | G06F 40/216 |
| 2019/0377619 A1 | 12/2019 | Riva | |
| 2020/0344185 A1 | 10/2020 | Singaraju | |
| 2021/0027770 A1 | 1/2021 | Olabiyi | |
| 2021/0304733 A1 | 9/2021 | Jalaluddin | |
| 2022/0180864 A1* | 6/2022 | Park | G06F 40/40 |

OTHER PUBLICATIONS

Palivela, "Optimization of paraphrase generation and identification using language models in natural language processing," IJIMDI, 2021—see attached reference in the first Office action. (Year: 2021).*

Dou et al., "MultiTalk: A Highly-Branching Dialog Testbed for Diverse Conversations." ARXIV, Feb. 2, 2021, 9 Pages. arXiv:2102.01263v1[cs.CL].

Madan et al., "Unsupervised Learning of Interpretable Dialog Models," Association for the Advancement of Artificial Intelligence, Nov. 2, 2018, 8 pages. https://arxiv.org/abs/1811.01012.

Mell et al., "The NIST Definition of Cloud Computing", Recommendations of the National Institute of Standards and Technology, NIST Special Publication 800-145, Sep. 2011, 7 pages.

Rizk et al., "A Unified Conversational Assistant Framework for Business Process Automation," ARXIV, Jan. 7, 2020, 9 Pages, https://arxiv.org/abs/2001.03543.

Sreedharan et al., "Explainable Composition of Aggregated Assistants," ARXIV, Nov. 21, 2020, 10 Pages, https://arxiv.org/abs/2011.10707.

Volkova et al., "Lightly supervised learning of procedural dialog systems." In Proceedings of the 51st Annual Meeting of the Association for Computational Linguistics, pp. 1669-1679, Aug. 2013.

Wu, et al., "Dialog Generation Using Multi-turn Reasoning Neural Networks", Association for Computational Linguistics, Proceedings of NAACL-HLT, Jun. 1-6, 2018, pp. 2049-2059.

* cited by examiner

GENERATING MULTI-TURN DIALOG DATASETS

BACKGROUND

The present application relates generally to the field of computer-based communication systems, and more particularly, to a system for generating multi-turn dialog datasets for training of dialog or conversational agents.

A dialog system/agent or a conversational system/agent is a computer system intended to converse with a human in a structured manner. Dialog systems may employ text, speech, graphics, haptics, gestures, or other modes for communication on both the input and output channel. Task-oriented dialog systems generally provide a computer-based interface for explaining information in a repository (e.g. a database) to a user via a "dialog" that is conducted between the system and the user. Dialog or conversational agents may include, for example, chat systems, chat agents, spoken dialog systems, digital personal assistants, and automated online assistants. Improved training of a system including a given dialog or conversational agent improves the ability of the system to effectively converse with a given user.

SUMMARY

According to one embodiment, a method, computer system, and computer program product for generating multi-turn dialog datasets for training of dialog or conversational agents is provided. The embodiment may include automatically selecting an agent from a set of agents. The embodiment may also include automatically calculating numbers corresponding to maximum depths of one or more nodes within a dialog tree found in the selected agent. The embodiment may also include automatically selecting a random dialog node from the one or more dialog nodes and generating a random number between a first number and a second number corresponding to the maximum depth of the selected random dialog node. The embodiment may further include automatically identifying sentences from training data of the selected agent that satisfy a first sequential node condition of the selected random dialog node. The embodiment may also include automatically determining an approach for responding to the first sequential node condition of the selected random dialog node that either satisfies the first sequential dialog node condition, or inserts a multi-turn conversational property, and generating a corresponding response. The embodiment may further include automatically determining additional approaches for responding to each condition contained within subsequent sequential child nodes of the selected random dialog node that either satisfy each subsequent sequential child node condition or insert a multi-turn conversational property, and generating corresponding responses for each subsequent sequential child node until a response is generated for the node corresponding to the generated random number between the first number and the second number corresponding to the maximum depth of the selected random dialog node. The embodiment may also include automatically collecting and storing data relating to the selected agent and the generated responses.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
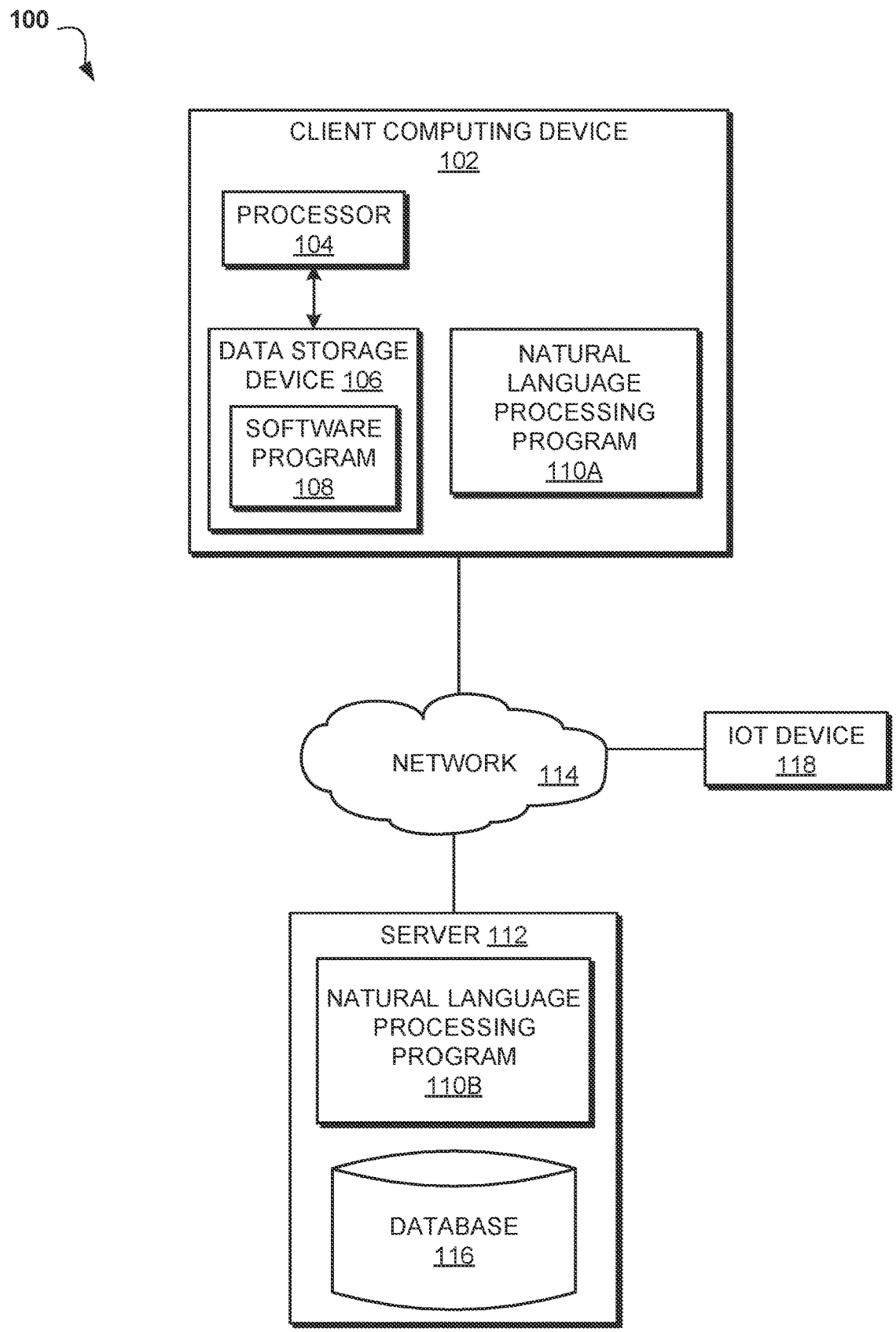
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to the field of computer-based communication systems, and more particularly, to a system for generating multi-turn dialog datasets for training of dialog or conversational agents. The following described exemplary embodiments provide a system, method, and program product to, among other things, automatically select an agent from a set of agents, automatically select a random dialog node from the selected agent, automatically determine an approach for responding to the first sequential node condition and each subsequent child node condition within the selected random dialog node of the selected random dialog node that either satisfies the node condition, or inserts a multi-turn conversational property, and generating corresponding responses for collection and storage of datasets. Therefore, the present embodiment has the capacity to improve the training of dialog or conversational agents by automatically generating multi-turn dialog datasets without the collection of data corresponding to human interactions with an agent.

As previously described, a dialog system/agent or a conversational system/agent is a computer system intended to converse with a human in a structured manner. Dialog systems may employ text, speech, graphics, haptics, gestures, or other modes for communication on both the input and output channel. Task-oriented dialog systems generally provide a computer-based interface for explaining information in a repository (e.g. a database) to a user via a "dialog" that is conducted between the system and the user. Dialog systems including agents that function as chat bots are pre-trained using intent and entity recognition models, and are typically implemented within limited conversational domains, because the larger the domain of a chat bot, the greater the required training. For conversational domains of any substantial significance, it is generally a significant undertaking to provide enough training data for the chat bot. This challenge is amplified further when the dialog system includes multiple agents having different specialties or functions. Typically, this challenge would have to be addressed by collecting costly and time-consuming datasets from human users interacting with the dialog system to provide further supplemental training. Illustrative embodiments described herein, allow for automatic generation of multi-turn dialog datasets that may be used for supplemental training while avoiding the costly and time-consuming nature of gathering human responses for supplemental training.

According to at least one embodiment of a computer system capable of employing methods in accordance with the present invention to generate multi-turn dialog datasets, the method, system, computer program product may automatically select an agent from a set of agents. The method, system, computer program product may then automatically calculate numbers corresponding to maximum depths of one or more nodes within a dialog tree found in the selected agent. Next, the method, system, computer program product may automatically select a random dialog node from the one or more dialog nodes and generate a random number between a first number and a second number corresponding to the maximum depth of the selected random dialog node. According to one embodiment, the method, system, computer program product may then automatically identify sentences from training data of the selected agent that satisfy a first sequential node condition of the selected random dialog node. Next, the method, system, computer program product may automatically determine an approach for responding to the first sequential node condition of the selected random dialog node that either satisfies the first sequential dialog node condition, or inserts a multi-turn conversational property, and generate a corresponding response. The method, system, computer program product may then automatically determine additional approaches for responding to each condition contained within subsequent sequential child nodes of the selected random dialog node that either satisfy each subsequent sequential child node condition or insert a multi-turn conversational property, and generate corresponding responses for each subsequent sequential child node until a response is generated for the node corresponding to the generated random number between the first number and the second number corresponding to the maximum depth of the selected random dialog node. The method, system, computer program product may then automatically collect and store data relating to the selected agent and the generated responses. In turn, the method, system, computer program product has automatically generated datasets including multi-turn conversations that may be used to further train a dialog or conversational system including one or more agents while avoiding the need to collect human responses.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for generating multi-turn dialog datasets for training of dialog or conversational agents.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a multi-turn dialog generation program 110A and communicate with the server 112 and IoT Device 118 via the communication network 114, in accordance with one embodiment of the present disclosure. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a multi-turn dialog generation program 110B and a database 116 and communicating with the client computing device 102 and IoT Device 118 via the communication network 114, in accordance with embodiments of the present disclosure. As will be discussed with reference to FIG. 3, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a mobile device, a voice-controlled personal assistant, and/or any other IoT Device 118 known in the art for receiving queries that is capable of connecting to the communication network 114, and transmitting and receiving data with the client computing device 102 and the server 112.

According to the present embodiment, the multi-turn dialog generation program 110A, 110B may be a program capable of automatically selecting an agent from a set of agents. Multi-turn dialog generation program 110A, 110B may then automatically calculate numbers corresponding to maximum depths of one or more nodes within a dialog tree found in the selected agent. Next, multi-turn dialog generation program 110A, 110B may then automatically select a random dialog node from the one or more dialog nodes and generate a random number between a first number and a second number corresponding to the maximum depth of the selected random dialog node. Multi-turn dialog generation program 110A, 110B may then automatically identify sentences from training data of the selected agent that satisfy a first sequential node condition of the selected random dialog node. Next, multi-turn dialog generation program 110A, 110B may automatically determine an approach for responding to the first sequential node condition of the selected random dialog node that either satisfies the first sequential dialog node condition, or inserts a multi-turn conversational property, and generate a corresponding response. Next, multi-turn dialog generation program 110A,110B may automatically determine an approach for responding to each condition contained within subsequent sequential child nodes of the selected random dialog node that either satisfy each subsequent sequential child node condition or insert a multi-turn conversational property, and generate corresponding responses for each subsequent sequential child node until a response is generated for the node corresponding to the generated random number between the first number and the second number corresponding to the maximum depth of the selected random dialog node. Finally, multi-turn dialog generation program 110A,110B may automatically collect and store data relating to the selected agent and the generated responses. In turn, multi-turn dialog generation program 110A,110B has automatically generated datasets including multi-turn conversations that may be used to further train a dialog or conversational system including one or more agents while avoiding the need to collect human responses.

Figure 2:
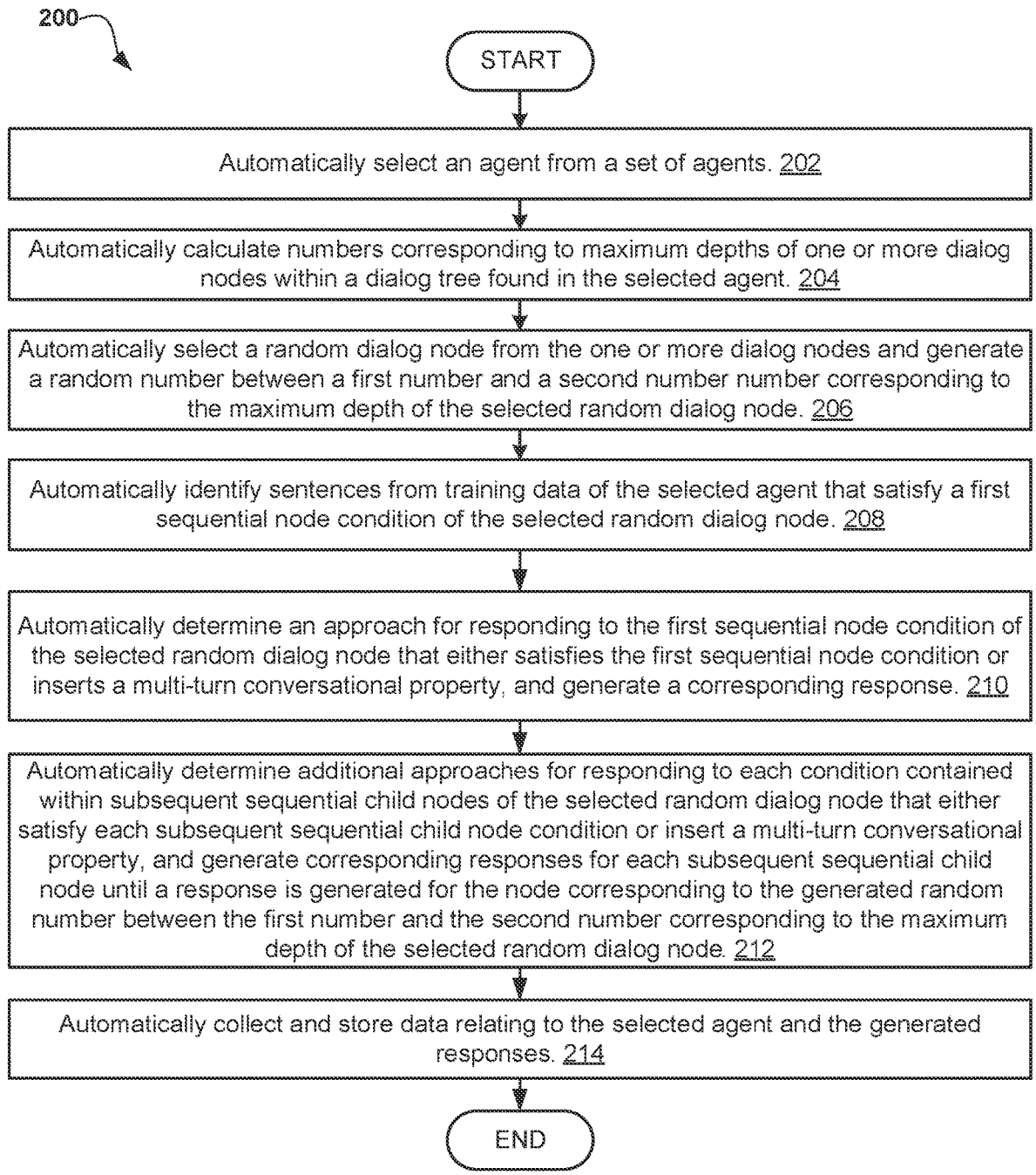
FIG. 2 illustrates an operational flowchart for generating multi-turn dialog datasets for training of dialog or conversational agents according to at least one embodiment.

Referring now to FIG. 2, an operational flowchart depicting a multi-turn dialog generation process 200 for generating multi-turn dialog datasets according to at least one embodiment is provided. At 202, the multi-turn dialog generation program 110A,110B automatically selects an agent from a set of agents. In the context of this disclosure an agent is any suitable conversational agent (sometimes referred to as a chatbot) that includes a program that can conduct conversation with users. The set of agents may be part of a dialog or communication system having multiple agents that specialize and are trained to handle different lines of user queries or inputs across multiple domains. For example, an exemplary dialog system may include a first agent that is trained for engaging in conversations with users regarding reserving flight tickets with an airline, while another agent in the same dialog system may specialize in booking rooms in hotels.

At 204, the multi-turn dialog generation program 110A, 110B automatically calculates numbers corresponding to maximum depths of one or more nodes within a dialog tree found in the selected agent. Each agent may include one or more dialog trees that may be associated with a particular type of customer, intent, or problem. Each node of a given dialog tree is indicative of a specific dialog prompt or action expected by the agent. Dialog progresses as the agent takes the dialog or action at each node, and receives responses from the user to move to the next node of the tree. For example, an agent having a dialog tree designed to help a user make an appointment to visit a specific store may include nodes that prompts the user to input what day the user wants to make the appointment, and then a subsequent node that prompts the user to input at what time on the selected day they want to have the appointment. Once multi-turn dialog generation program 110A,110B has selected a random agent, it automatically calculates numbers corresponding to the maximum depth for each node contained therein. The maximum depth of a given dialog tree corresponds to the number of nodes along the longest path from the root (first) node down to the farthest leaf node. Typically, maximum depths for each node are limited to control training time and processing or classification time.

Next, at 206, multi-turn dialog generation program 110A, 110B automatically selects a random dialog node from the one or more dialog nodes considered at 204, and generates a number between a first number and a second number corresponding to the maximum depth of the selected random dialog node. For example, if multi-turn dialog generation program 110A,110B selects a random agent X having a maximum depth of 20 (calculated at 204), then multi-turn dialog generation program 110A,110B will now generate a number between 1 and 20, such as 15.

At 208, multi-turn dialog generation program 110A,110B automatically identifies sentences from training data of the selected agent that satisfy a first sequential node condition of the selected random dialog node. For example, using the same example as above, if the first sequential node of the selected random dialog node relates to prompting a user to input an appointment day, then multi-turn dialog generation program 110A,110B will identify sentences from the training data of the agent containing that first sequential node to identify sentences from the training data that correspond to valid answers satisfying the condition of the first sequential node. In the above example, the identified sentences would be related to potential user inputs relating to various dates and days of the week that would satisfy the first sequential node condition.

Next, at 210, multi-turn dialog generation program 110A, 110B automatically determines an approach for responding to the first sequential node condition of the selected random dialog that either satisfies the first sequential node condition, or inserts a multi-turn conversational property, and then generates a corresponding response. In the context of this disclosure, a multi-turn conversational property may include a number of human-like conversational turns that do not meet a given nodes condition. Examples of multi-turn conversational properties will be discussed in greater detail below. According to one embodiment, multi-turn dialog generation program 110A,110B may automatically determine the approach arbitrarily by either responding to the first sequential node condition with a valid response taken from 208, or instead responding to the first sequential node with a multi-turn conversational property. In other embodiments, the determination of which approach to take may be weighted to a desired ratio. For example, in an exemplary embodiment, a user may configure multi-turn dialog generation program 110A,110B to generate a valid response 20% of the time, and generate a multi-turn conversational property 80% of the time. As such, when multi-turn dialog generation program 110A,110B determines an approach for responding to each node, it will consider the previously assigned weight assigned to the generation of a valid response and the generation of a multi-turn conversational property in each instance.

If multi-turn dialog generation program 110A,110B decides at 210 to respond with a multi-turn conversational property, then multi-turn dialog generation program 110A, 110B will generate a response that injects a number of potential conversational turns meant to more accurately represent human behavior. For example, in some cases, multi-turn dialog generation program 110A,110B may inject into the dialog a digression. A digression is when the user is in the middle of a dialog flow that is designed to address one goal, and then the user switches topics to initiate a different dialog flow. For example, a first node of a given dialog tree may ask a user what day they would like to come in for an appointment. To inject a digression, multi-turn dialog generation program 110A,110B may input an unrelated response stating 'Drive me to the nearest restaurant'. This response is clearly unrelated to the original ask of the node, prompting the user to input a day or date, and would thus generate a unique result that may be helpful in supplemental training of the system and agent.

In another example, multi-turn dialog generation program 110A,110B may respond to a given dialog node with a multi-turn conversational property including an unclear intent that may generate a dataset that would be helpful in training a system to better handle disambiguation. Disambiguation is when an agent receives a response that is unclear in its intent, and therefore the system must attempt to prompt the user to clarify what their intent is. For example, a user may input a statement to an agent that states 'I want my number'. This statement is unclear in its intent, and the agent may respond with a prompt stating "Did you mean: 'Ticket Number' 'Airline Number' 'Change Ticket' 'None of the above' 'Cancel'."

In yet another example, multi-turn dialog generation program 110A,110B may respond to a given dialog node with a multi-turn conversational property including a statement that requires slot filling. Slot filling refers to instances in which an agent receives an input from a user that requires the agent to then obtain multiple required parameter values from the user. For example, if a user wishes to change a seating assignment for a flight, an agent may subsequently ask for multiple parameters from the user such as their name, date of birth, etc.

While a number of exemplary multi-turn conversational properties are discussed above, such as digression, disambiguation, and slot-filling, multi-turn dialog generation program 110A,110B may be configured to generate responses to mimic any suitable or desired multi-turn conversational property that may help to generate datasets useful for supplemental training of a given agent using the methods described herein. Additionally, according to one embodiment, multi-turn dialog generation program 110A,110B may be configured to generate a variety of unique responses for each instance in which a multi-turn conversational property is injected into a dialog flow. For example, multi-turn dialog generation program 110A,110B may be trained with paraphrasing models to allow multi-turn dialog generation program 110A,110B to modify a given sentence meant to inject a multi-turn conversational property. This increases the number of unique sentences and examples that multi-turn dialog generation program 110A,110B can help generate for supplemental training of a given agent. In another embodiment, multi-turn dialog generation program 110A,110B may modify a given sentence meant to inject a multi-turn conversational property by translating the sentence from a first language to a second language to generated a translated response, and then translating the translated response back into the first language. For example, multi-turn dialog generation program 110A,110B may translate a response from English to German, and then translate the German translation back into English. This would have the same effect of generating slightly different responses to generate additional outputs and improve the training of a given agent.

Next, at 212, multi-turn dialog generation program 110A, 110B automatically determines additional approaches for responding to each condition contained within subsequent sequential child nodes of the selected random dialog node that either satisfies each subsequent sequential child node condition or inserts a multi-turn conversational property, and generates corresponding responses for each subsequent sequential child node until a response is generated for the node corresponding to the generated random number between the first number and the second number corresponding to the maximum depth of the selected random dialog node. In other words, multi-turn dialog generation program 110A,110B will continue to systematically repeat the process described at 210 for each subsequent sequential node in the dialog tree until the node corresponding to the number generated at 206 is reached. That is multi-turn dialog generation program 110A,110B will continue to randomly generate responses designed to either provide a valid response or inject a multi-turn conversational property for each subsequent node condition. This will create a human-like conversation including multiple generated responses that vary between meeting node conditions or inserting human-like conversational turns.

Finally at 214, multi-turn dialog generation program 110A,110B collects and stores data relating to the selected agent and the generated responses. As discussed above, multi-turn dialog generation program 110A,110B generates datasets including human-like conversations for use in automatically generating datasets that may be used for supplemental training of dialog and conversational systems including one or more agents therein. These datasets are generated and collected without the need for time-intensive and costly gathering of human responses. According to one embodiment, the collected and stored data may be used to generate datasets useful for training models that utilize machine learning to train exemplary dialog and conversational systems. In other words, exemplary dialog and conversational systems may include machine learning models to allow agents or chatbots therein to be trained using the datasets automatically generated by multi-turn dialog generation program 110A,110B, as the exemplary dialog and conversational systems rely on machine learning models to engage in intent recognition, responding to users, and various other functions.

In the context of this disclosure, machine learning broadly describes a function of a system that learns from data. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule.

It may be appreciated that FIG. 2 provides only illustrations of an exemplary implementation and does not imply any limitations with regard to how different embodiments may be implemented. Many modifications to the depicted environments may be made based on design and implementation requirements.

Figure 3:
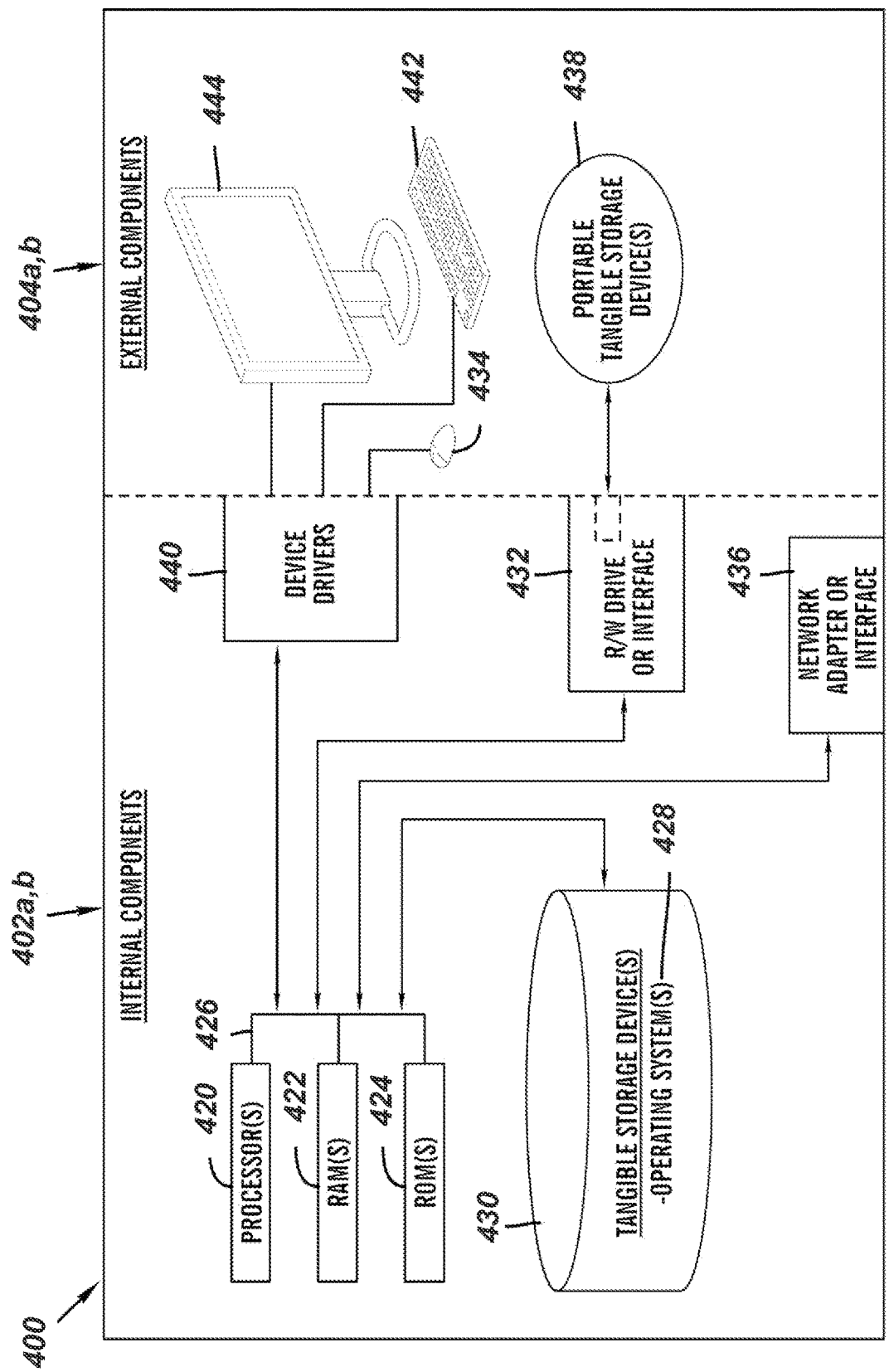
FIG. 3 is a functional block diagram of internal and external components of computers and servers depicted in FIG. 1 according to at least one embodiment.

FIG. 3 is a block diagram 400 of internal and external components of the client computing device 102 and the server 112 depicted in FIG. 1 in accordance with an embodiment of the present disclosure. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 3. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the multi-turn dialog generation program 110A in the client computing device 102 and the multi-turn dialog generation program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 3, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the multi-turn dialog generation program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the multi-turn dialog generation program 110A in the client computing device 102 and the multi-turn dialog generation program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the multi-turn dialog generation program 110A in the client computing device 102 and the multi-turn dialog generation program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 include hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
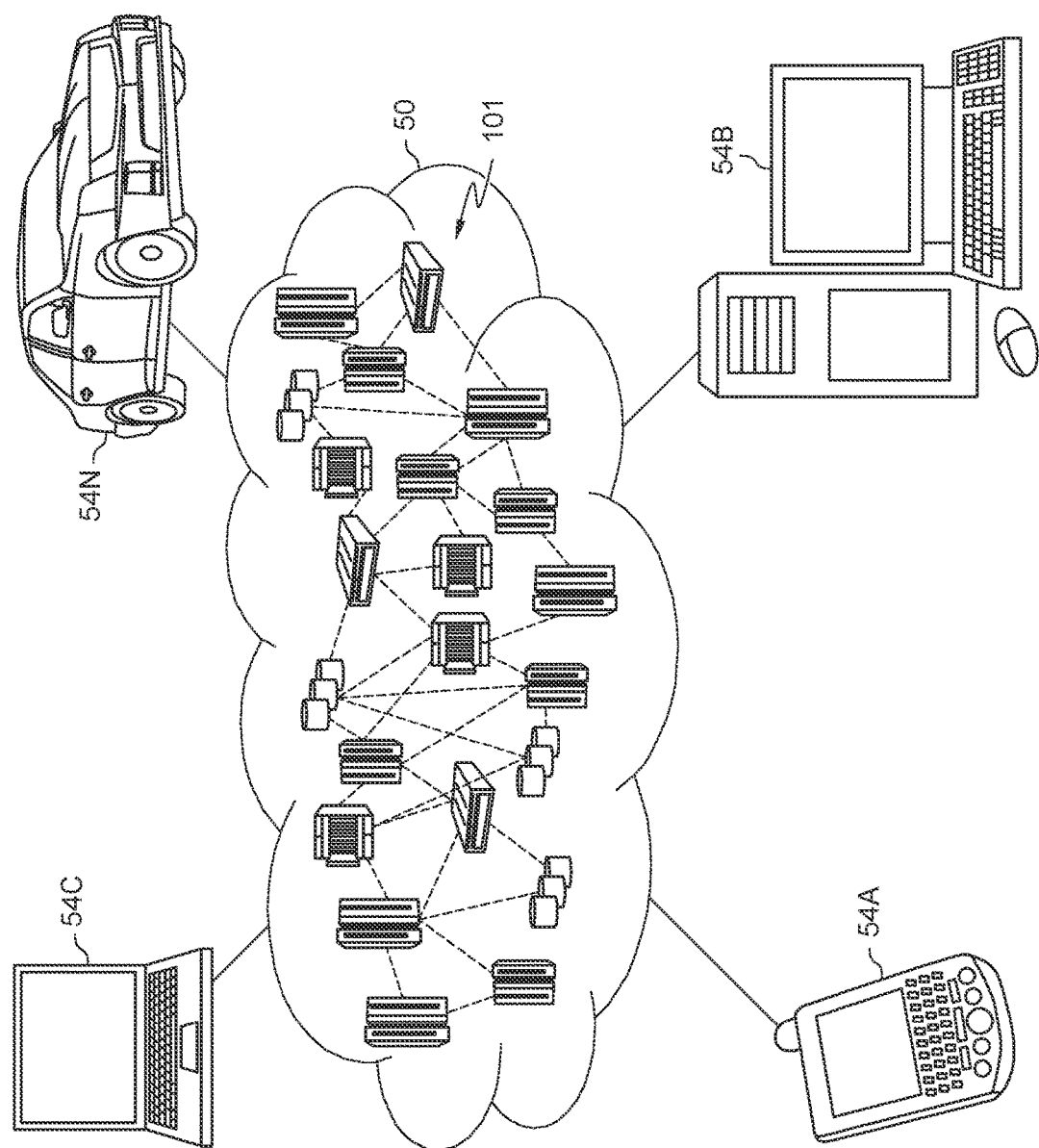
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 101 with which local computing devices used by cloud consumers, such as, for example, personal digital assistant (PDA) or cellular telephone 54A, desktop computer 54B, laptop computer 54C, and/or automobile computer system 54N may communicate. Nodes 101 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
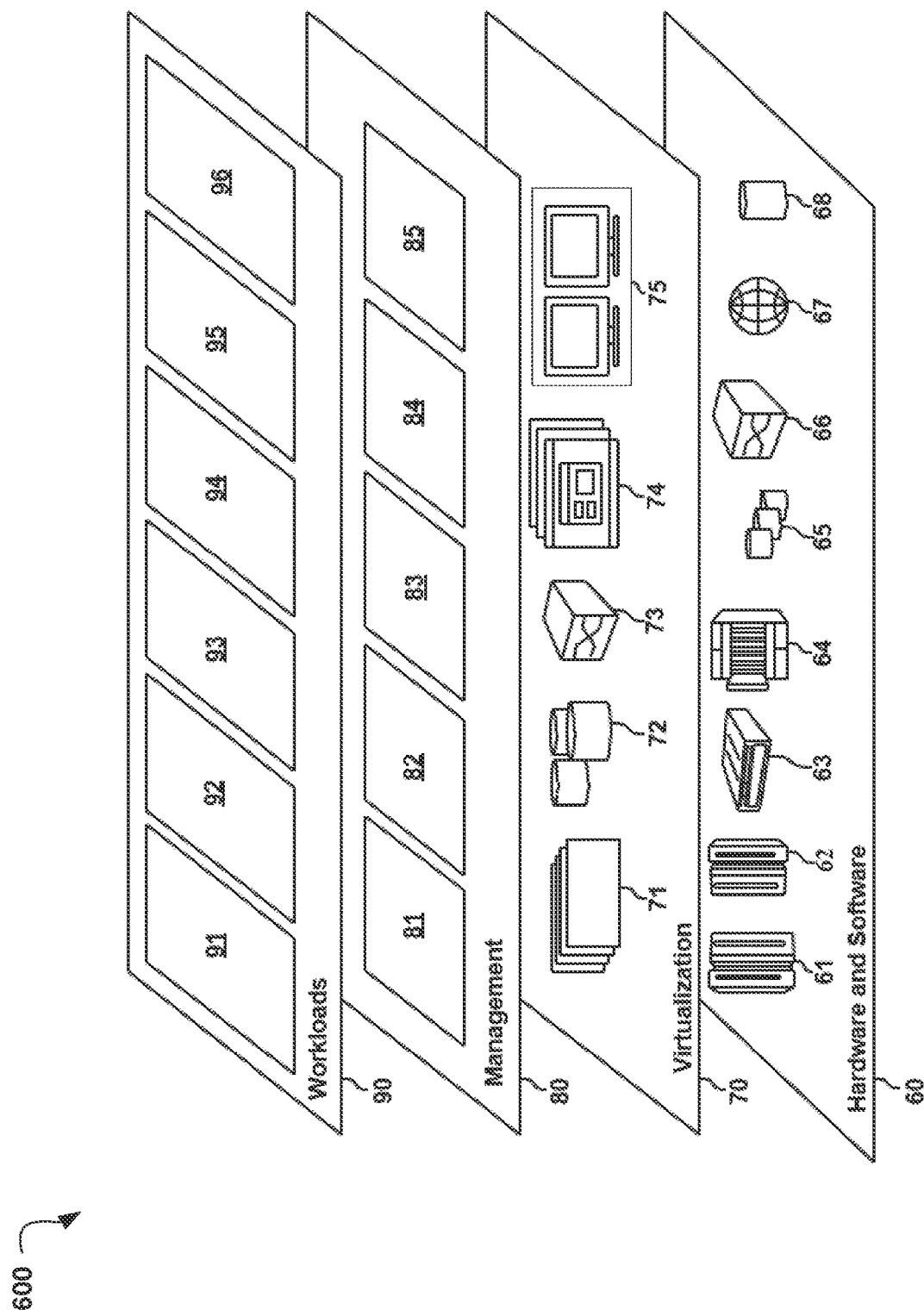
FIG. 5 depicts abstraction model layers according to an embodiment of the present invention.

Referring now to FIG. 5, a set of functional abstraction layers 600 provided by cloud computing environment 50 is shown. It should be understood in advance that the components, layers, and functions shown in FIG. 5 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating multi-turn dialog datasets 96. Generating multi-turn dialog datasets 96 may relate to automatically generating datasets including multi-turn conversations that may be used to further train a dialog or conversational system including one or more agents while avoiding the need to collect human responses The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of generating multi-turn dialog datasets for training of a dialog or a conversational system having one or more agents, the method comprising:
    automatically selecting an agent from a set of agents;
    automatically calculating numbers corresponding to maximum depths of one or more nodes within a dialog tree found in the selected agent, the maximum depth corresponding to a number of nodes along a path from a root of the dialog tree down to the maximum depth of the one or more nodes;
    automatically selecting a random dialog node from the one or more dialog nodes and generating a random number between a first number corresponding to a dialog node at the root of the tree and a second number corresponding to the maximum depth of the selected random dialog node along the path;
    automatically identifying sentences from training data of the selected agent that are related to and satisfy a first sequential node condition of the selected random dialog node;
    automatically determining an approach for responding to the first sequential node condition of the selected random dialog node that either satisfies the first sequential dialog node condition, or inserts a multi-turn conversational property, and generating a corresponding response;
    automatically determining additional approaches for responding to each condition contained within subsequent sequential child nodes of the selected random dialog node that either satisfy each subsequent sequential child node condition or insert a multi-turn conversational property, and generating corresponding responses for each subsequent sequential child node until a response is generated for the node corresponding to the generated random number; and
    automatically collecting and storing data relating to the selected agent and the generated responses, the data related to the selected agent and the generated responses to be used as training data for training of a dialog or a conversational system.

2. The computer-based method of claim 1, further comprising: modifying one or more of the generated corresponding responses by paraphrasing.

3. The computer-based method of claim 1, further comprising: modifying one or more of the generated corresponding responses by translating the one or more of the generated corresponding responses from a first language to a second language to generate a translated response, and then subsequently translating the translated response back into the first language.

4. The computer-based method of claim 1, wherein automatically collecting and storing data relating to the selected agent and the generated responses further comprises:
    automatically generating datasets used in conjunction with a machine learning model for training a dialog or communication system having one or more agents.

5. The computer-based method of claim 1, wherein the set of agents comprises a series of specialized agents trained on a corresponding series of unique domains.

6. The computer-based method of claim 1, wherein automatically determining the additional approaches for responding to each condition contained within the subsequent sequential child nodes of the selected random dialog node that either satisfy each subsequent sequential child node condition or insert the multi-turn conversational property, and generating the corresponding responses for each subsequent sequential child node until the response is generated for the node corresponding to the generated random number further comprises:
    automatically identifying sentences from the training data of the selected agent that satisfy each sequential child node condition of the selected random dialog node.

7. The computer-based method of claim 1, wherein the approach for responding to the first node condition and the additional approaches for responding to each subsequent child node condition are determined in accordance with a pre-assigned weight for the generation of a valid response or the generation of a multi-turn conversational property.

8. A computer system, the computer system comprising:
    one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
    automatically selecting an agent from a set of agents;
    automatically calculating numbers corresponding to maximum depths of one or more nodes within a dialog tree found in the selected agent, the maximum depth corresponding to a number of nodes along a path from a root of the dialog tree down to the maximum depth of the one or more nodes;
    automatically selecting a random dialog node from the one or more dialog nodes and generating a random number between a first number corresponding to a dialog node at the root of the tree and a second number corresponding to the maximum depth of the selected random dialog node along the path;
    automatically identifying sentences from training data of the selected agent that are related to and satisfy a first sequential node condition of the selected random dialog node;
    automatically determining an approach for responding to the first sequential node condition of the selected random dialog node that either satisfies the first sequential dialog node condition, or inserts a multi-turn conversational property, and generating a corresponding response;
    automatically determining additional approaches for responding to each condition contained within subsequent sequential child nodes of the selected random dialog node that either satisfy each subsequent sequential child node condition or insert a multi-turn conversational property, and generating corresponding responses for each subsequent sequential child node until a response is generated for the node corresponding to the generated random number; and automatically collecting and storing data relating to the selected agent and the generated responses, the data related to the selected agent and the generated responses to be used as training data for training of a dialog or a conversational system.

9. The computer system of claim 8, further comprising: modifying one or more of the generated corresponding responses by paraphrasing.

10. The computer system of claim 9, further comprising: modifying one or more of the generated corresponding responses by translating the one or more of the generated corresponding responses from a first language to a second language to generate a translated response, and then subsequently translating the translated response back into the first language.

11. The computer system of claim 8, wherein automatically collecting and storing data relating to the selected agent and the generated responses further comprises:
automatically generating datasets used in conjunction with a machine learning model for training a dialog or communication system having one or more agents.

12. The computer system of claim 8, wherein the set of agents comprises a series of specialized agents trained on a corresponding series of unique domains.

13. The computer system of claim 8, wherein automatically determining the additional approaches for responding to each condition contained within the subsequent sequential child nodes of the selected random dialog node that either satisfy each subsequent sequential child node condition or insert the multi-turn conversational property, and generating the corresponding responses for each subsequent sequential child node until the response is generated for the node corresponding to the generated random number further comprises:
automatically identifying sentences from the training data of the selected agent that satisfy each sequential child node condition of the selected random dialog node.

14. The computer system of claim 8, wherein the approach for responding to the first node condition and the additional approaches for responding to each subsequent child node condition are determined in accordance with a pre-assigned weight for the generation of a valid response or the generation of a multi-turn conversational property.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
automatically selecting an agent from a set of agents;
automatically calculating numbers corresponding to maximum depths of one or more nodes within a dialog tree found in the selected agent, the maximum depth corresponding to a number of nodes along a path from a root of the dialog tree down to the maximum depth of the one or more nodes;
automatically selecting a random dialog node from the one or more dialog nodes and generating a random number between a first number corresponding to a dialog node at the root of the tree and a second number corresponding to the maximum depth of the selected random dialog node along the path;
automatically identifying sentences from training data of the selected agent that are related to and satisfy a first sequential node condition of the selected random dialog node;
automatically determining an approach for responding to the first sequential node condition of the selected random dialog node that either satisfies the first sequential dialog node condition, or inserts a multi-turn conversational property, and generating a corresponding response;
automatically determining additional approaches for responding to each condition contained within subsequent sequential child nodes of the selected random dialog node that either satisfy each subsequent sequential child node condition or insert a multi-turn conversational property, and generating corresponding responses for each subsequent sequential child node until a response is generated for the node corresponding to the generated random number; and
automatically collecting and storing data relating to the selected agent and the generated responses, the data related to the selected agent and the generated responses to be used as training data for training of a dialog or a conversational system.

16. The computer program product of claim 15, further comprising:
modifying one or more of the generated corresponding responses by paraphrasing.

17. The computer program product of claim 16, further comprising:
modifying one or more of the generated corresponding responses by translating the one or more of the generated corresponding responses from a first language to a second language to generate a translated response, and then subsequently translating the translated response back into the first language.

18. The computer program product of claim 15, wherein automatically collecting and storing data relating to the selected agent and the generated responses further comprises:
automatically generating datasets used in conjunction with a machine learning model for training a dialog or communication system having one or more agents.

19. The computer program product of claim 15, wherein the set of agents comprises a series of specialized agents trained on a corresponding series of unique domains.

20. The computer program product of claim 15, wherein the approach for responding to the first node condition and the additional approaches for responding to each subsequent child node condition are determined in accordance with a pre-assigned weight for the generation of a valid response or the generation of a multi-turn conversational property.

* * * * *